United States Patent [19]
McGregor et al.

[11] Patent Number: 5,464,965
[45] Date of Patent: Nov. 7, 1995

[54] APPARATUS FOR CONTROLLING TEMPERATURE OF AN ELEMENT HAVING A TEMPERATURE VARIABLE RESISTANCE

[75] Inventors: John A. McGregor; Robert P. Parris, both of Phoenix, Ariz.

[73] Assignee: Honeywell Inc., Minneapolis, Minn.

[21] Appl. No.: 49,925

[22] Filed: Apr. 20, 1993

[51] Int. Cl.$^6$ ........................................ H05B 1/02
[52] U.S. Cl. .................... 219/497; 219/499; 219/505; 219/506; 219/481
[58] Field of Search ............................ 219/501, 505, 219/497, 4, 494, 499, 506; 307/117

[56]     References Cited

U.S. PATENT DOCUMENTS

| | | | |
|---|---|---|---|
| 3,789,190 | 1/1974 | Orosy et al. | 219/492 |
| 4,162,379 | 7/1979 | Sebens et al. | 219/497 |
| 4,695,709 | 9/1987 | Sachs et al. | 219/494 |
| 4,705,937 | 11/1987 | Marek | 219/505 |
| 4,858,576 | 8/1989 | Jeffries et al. | 219/497 |
| 4,962,300 | 10/1990 | Watanabe | 219/497 |

*Primary Examiner*—Mark H. Paschall
*Attorney, Agent, or Firm*—Seymour Levine; Ronald E. Champion; William T. Udseth

[57]     ABSTRACT

A fast and accurate temperature controller for a device heated by current through a resistive element, such as various air data probes, wherein the resistance of the element varies with temperature. The temperature controller samples the temperature by selecting the resistance value of the resistive element. Analog calculations are performed based on the instantaneous applied voltage and current returned through the resistive element. Current through the resistive element is controlled by comparing the resistance of the element to a resistance value selected in accordance with the temperature characteristics of the element. Insensitivity to voltage and frequency variations is provided with a highly reliable and uncomplicated circuit having a small number of components.

11 Claims, 7 Drawing Sheets

$$V_I - V_V = (R_I/R_P - K)\alpha A_I V_P \quad K = \beta A_V / \alpha A_I$$

| $|V_V| > |V_I|$ | $R_I/R_P < K$ | $A_O = 0$ | SWITCH ON |
|---|---|---|---|
| $|V_V| < |V_I|$ | $R_I/R_P > K$ | $A_O = 1$ | SWITCH OFF |

APPARATUS FOR CONTROLLING TEMPERATURE OF AN ELEMENT HAVING A TEMPERATURE VARIABLE RESISTANCE

BACKGROUND OF THE INVENTION

1. Field of the Invention

The invention relates to aircraft pitot probes, and particularly to controllers for regulating the pitot probe temperature.

2. Description of the Prior Art

A pitot probe is mounted outside the aircraft below the cockpit. These probes vent the total air pressure induced by the forward motion of the aircraft into the aircraft pressure vessel whereat the pressure is sensed by the air data system. Since the pitot probe is exposed to aircraft's exterior environment, it must be heated to maintain the pressure inlet free of ice. When the aircraft systems are powered up, full power is applied to the pitot probe heater. If the temperature is not controlled it may be in the range between 800° F. and 1100° F. when the aircraft is not flying. Such excessive temperature causes many pitot probes to prematurely fail.

To prevent premature failure the prior art employs a "Half Power" switch which couples only half the in-flight applied power to the pitot probe when the aircraft systems are powered up and the aircraft is on the ground. Generally this is accomplished by half wave rectifying the 115 V ac heater voltage. The switch is held in the "Half Power" position by an on-ground signal, as for example a weight on wheels signal, which is applied when the aircraft is on the ground. When the on-ground signal indicates that the aircraft has left the ground, the switch is activated to remove the half wave rectification and full power is applied to the pitot probe heater element. The half wave rectification reduces the probe temperature on ground to the range between 500° F. and 800° F. from the full power range between 800° F. and 1100° F. Though a significant temperature reduction is realized, many probes protected by the "Half Power" switch continue to experience high temperature related failures.

SUMMARY OF THE INVENTION

In accordance with the principles of the present invention a proportional power controller determines the resistance of the pitot probe heater element by measuring the instantaneous voltage applied thereto and the instantaneous current flowing therethrough. The resistance of the pitot probe heater varies with temperature. As for example, the resistance of a pitot probe at room temperature (78° F.) without power applied may be 42.5Ω±6Ω and rise to 75Ω at 380° F. After power is applied to the pitot probe, the controller samples the resistance of the heater element at 40ms intervals. In the preferred embodiment, current samples of 2.5 ms duration are taken at the negative half cycle peak of the 400 Hz, 115 V ac wave applied to the heater element. These samples are utilized with the voltage applied to the heater element to determine the heater element resistance. A switch in the current return path of the pitot probe controls the flow of current. After an initial resistance measurement, this switch is positioned in accordance with the results of the measurement. The switch is opened when the resistance exceeds a preselected resistance, as for example 59Ω which correlates to a probe tip temperature of approximately 350° F., and remains opened until the next reset pulse is generated at the conclusion of the 40 ms interval. The switch position is unaltered for the remaining 37.5 ms unless a subsequent measurement determines that the 59Ω threshold has been crossed, whereafter the switch is opened. The 59Ω threshold is for the pitot probe of the above example. This threshold, however, is variable and may be selected based on the critical value of the pitot probe heater under consideration.

The invention includes a fault wraparound which monitors the probe operation and the 115 V ac voltage applied to the probe heater element. The operations monitor includes an open circuit detector which uses a selected resistance value, as for example 200Ω, as a fault point reference. Probe heater element short circuits to the probe case are detected by recognizing that current returns for such a short circuit are directed to the aircraft skin instead of the return line. Consequently, such a short circuit appears to the controller as an open circuit. When such a failure occurs, the controller heats the probe by reapplying power for at least one cycle of the 400 Hz wave every 40 ms. After the first cycle (2.5 ms) is completed, the power remains on until the 59Ω control point is achieved, after which the power is removed from the probe heater element in the manner previously described.

A failure of the voltage applied to the probe is monitored by comparing this voltage to a selected reference, as for example 87 V ac. Any voltage below the reference level is considered a voltage failure.

The invention will now be described, by way of example, with reference to the accompanying drawings.

BRIEF DESCRIPTION OF THE DRAWINGS

FIG. 6a is a truth table for a two input terminal NAND gate.

DESCRIPTION OF THE PREFERRED EMBODIMENT

Figure 1:
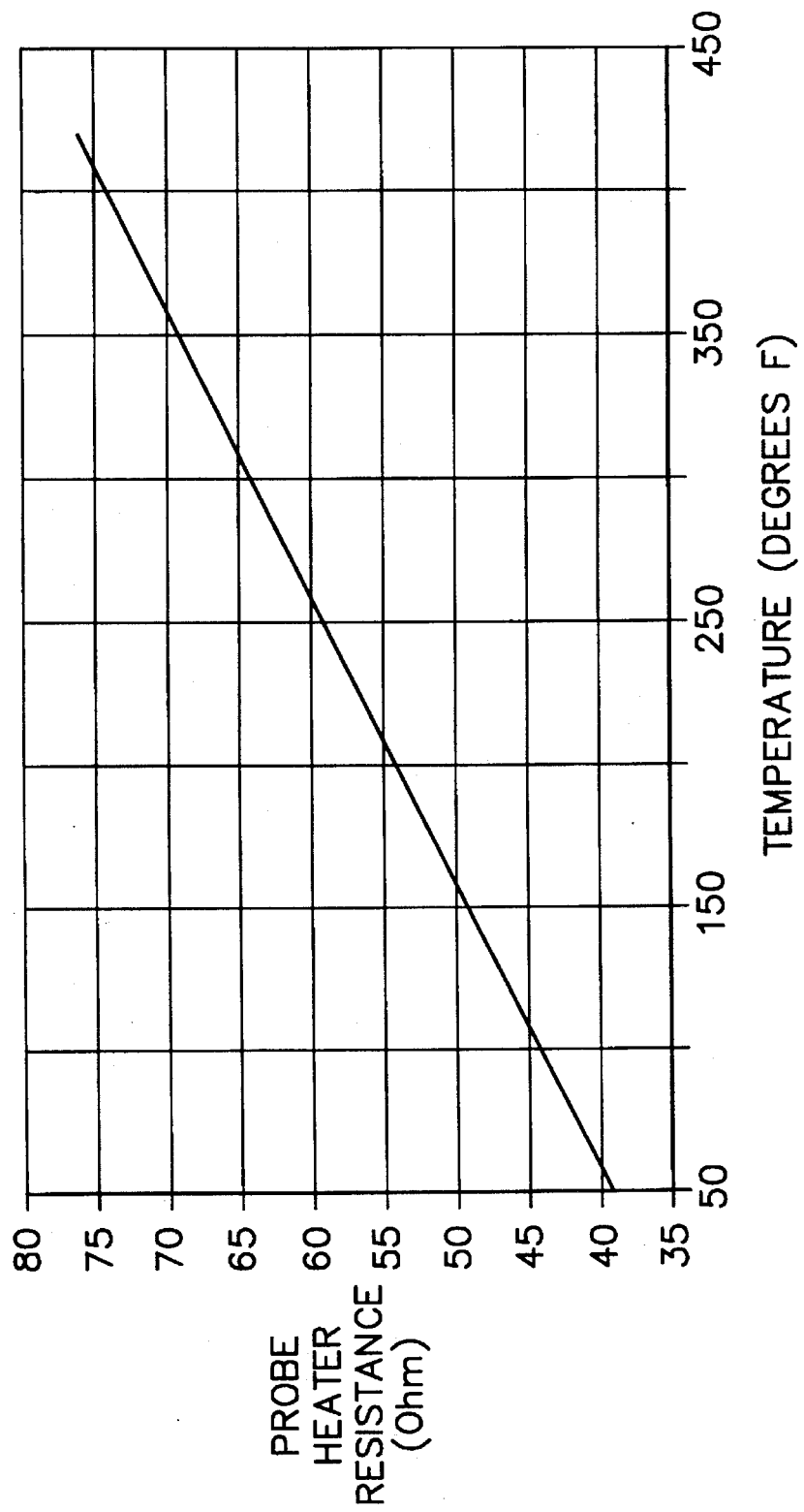
FIG. 1 is a plot of resistance as a function of temperature for an example pitot probe.

Refer now to FIG. 1 wherein a graph of resistance versus temperature for a typical pitot probe is shown. Information shown in the graph may be employed to determine the temperature of the probe from a measurement of the probe instantaneous resistance. As indicated, resistance of the probe increases approximately 10 ohms for each increase in temperature of 100 degrees fahrenheit (38° celsius). Since increases of hundreds of degrees fahrenheit are encountered when power is applied to a pitot probe, the measurement of instantaneous resistance is a viable way of determining when a probe approaches a failure temperature.

Figure 2:
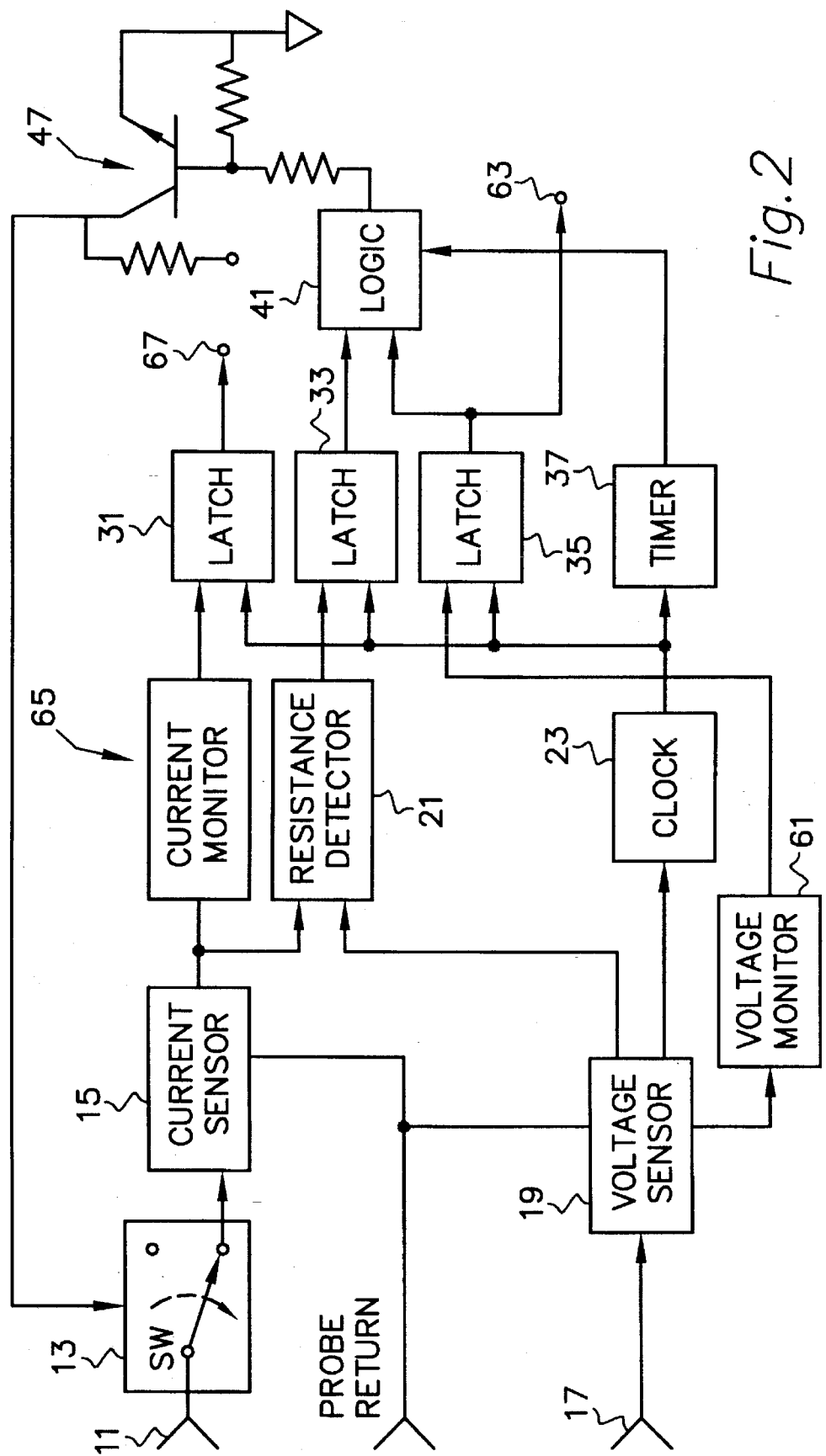
FIG. 2 is a block diagram of a preferred embodiment of the invention.

Refer now to the diagram of the invention shown in FIG. 2. Current passing through the pitot probe is coupled from terminal 11 through a switch 13 to a current sensor 15. The AC voltage applied to the probe, which may be at a frequency of 400 Hz, is coupled via terminal 17 to voltage sensor 19. Signals representative of the current and voltage are coupled to a resistance detector 21 wherein, in a manner to be described subsequently, the current and voltage representative signals are utilized to provide a signal indicating whether or not the probe resistance has reached a value corresponding to a temperature which has been selected as maximum for the present operating condition. A high level signal (logic 1) is provided when the probe resistance is above the critical resistance and a low level signal (logic 0) is provided when the probe resistance is below the critical resistance. Detection of a resistance above the critical resistance causes the switch 13 to open, in a manner to be explained, preventing further current from flowing through the pitot probe.

Figure 3:
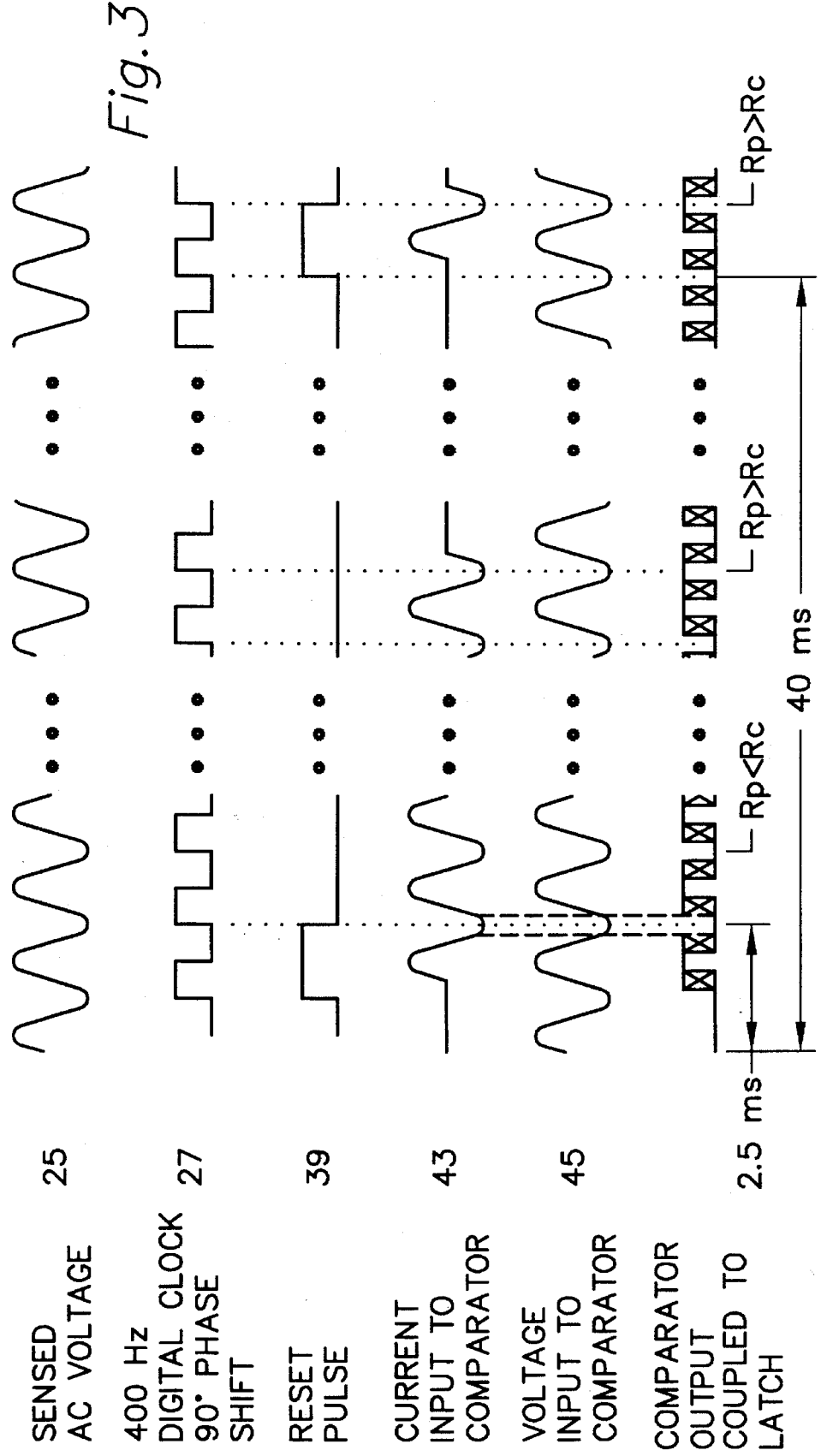
FIG. 3 is a series of waveforms useful for describing the operation of the invention.

Refer now to FIG. 3 with continued reference to FIG. 2. Sensed 400 Hz AC voltage 25 is coupled from the voltage sensor 17 to a circuit 23, labeled "clock" in FIG. 2, wherein it is phase shifted by 90° and converted to a 400 Hz square wave 27, which is used to clock latches 31, 33, and 35 and timer 37. In response to the clock pulses, timer 37 provides a 2.5 millisecond (ms) pulse 39 every 40 ms to a logic circuit 41. This pulse, as will be explained, is utilized to close the switch 13 periodically in order to sample the probe for the critical resistance.

Output level samples, at a 400 Hz rate, are taken of the resistance detector 21 by clocking the output level thereof into the latch 33 at low-to-high pulse transitions of the clock 23. These samples are coupled to the logic circuit 41 on the subsequent low to high transition. As will be explained, logic circuit 41 provides a high level signal to the base of a transistor 47 when the resistance detector indicates that the probe resistance is below the critical value and a low level signal when the resistance detector indicates that the probe resistance is above the critical value. The transistor 47 and switch 13 are arranged so that the switch is "on", completes the series circuit of probe, voltage source, and probe return, when a low level signal is provided at the collector of transistor 47 and the switch is "off", brakes the series circuit, when a high level signal is provided at the collector of transistor 47.

Due to the 90° phase shift of the square wave 27 relative to the 400 Hz AC voltage wave 25 and circuit inversions, samples are taken at the positive peak of the 400 Hz AC wave 25. The current wave 43 and voltage wave 45 coupled from the current sensor 15 and voltage sensor 19 to the resistance detector 21 are at a negative peak at the sampling times, as indicated in FIG. 3.

Figure 4:
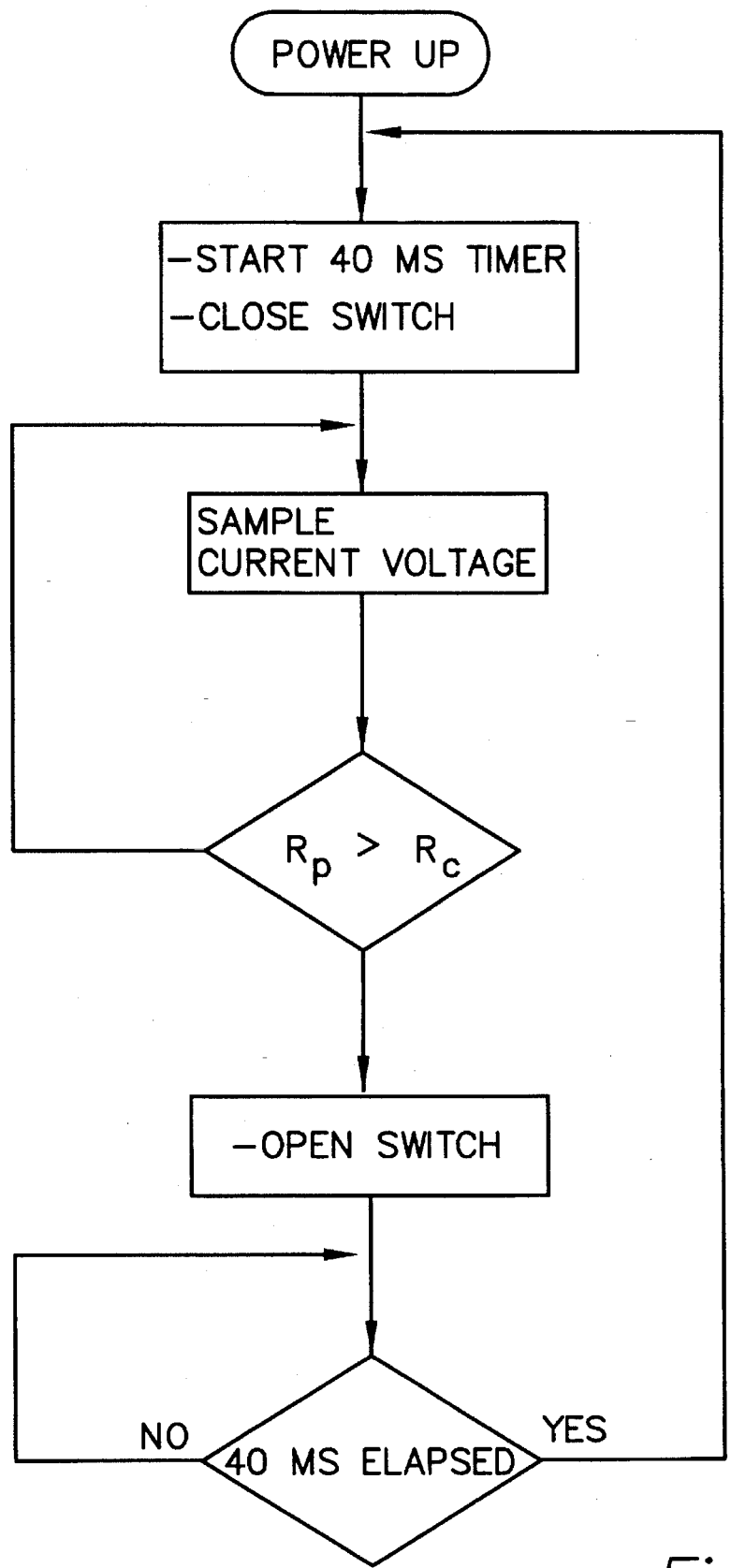
FIG. 4 is a flow chart for the embodiment shown in FIG. 2.

A flow chart of the monitoring process is shown in FIG. 4. At "power up" the 40 ms timing sequence is initiated and the switch is closed, permitting current to flow through the probe. The current and voltages are sampled and a probe resistance level determination is made. If the probe resistance does not exceed the critical resistance value, the sampling continues. Should the probe resistance exceed the critical value, the switch is opened and remains open until the 40 ms cycle is completed whereafter the switch is reset and the cycle is repeated.

Figure 5:
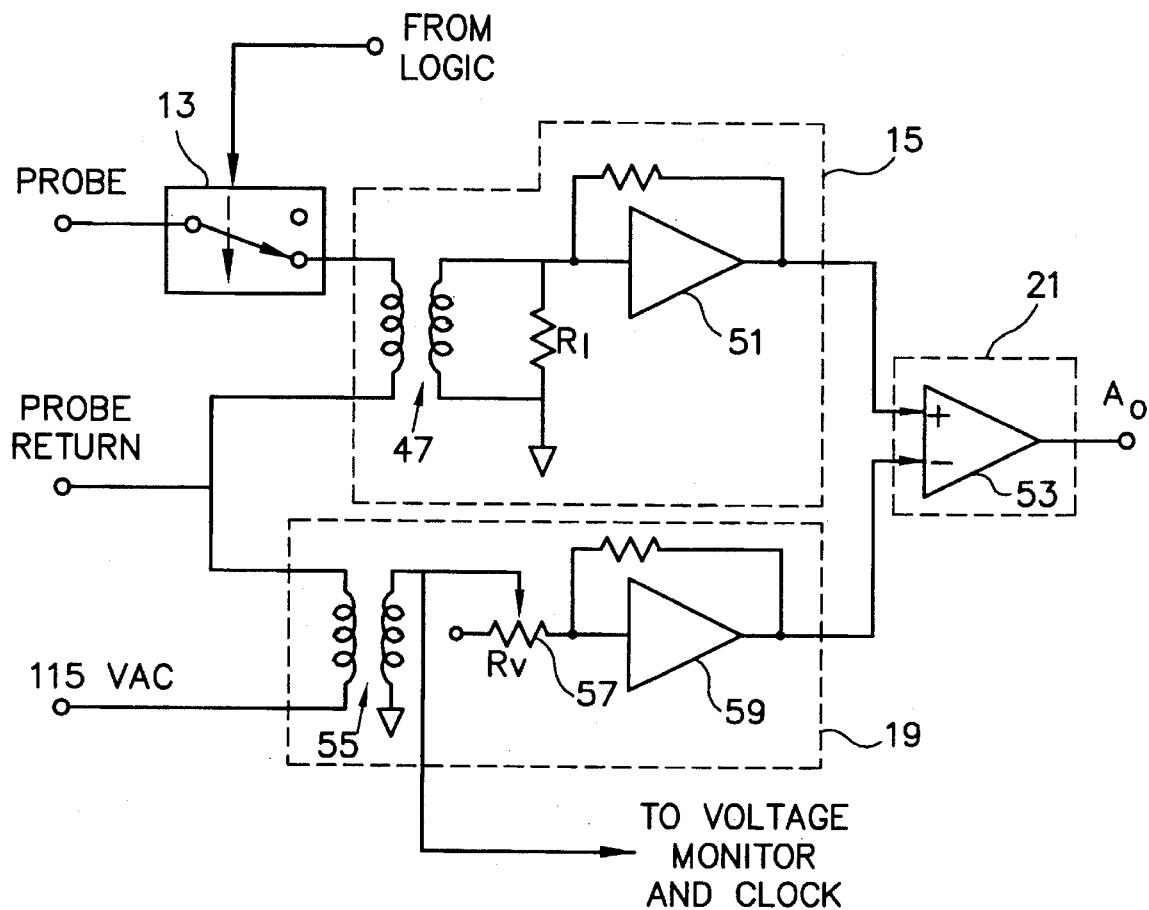
FIG. 5 is a schematic diagram of current sensor, voltage sensor, and resistance detector circuits.

Refer now to FIG. 5, wherein a schematic diagram, including the switch 13, current sensor 15, voltage sensor 19, and resistance detector 21, is shown. In FIG. 5, and all subsequent figures, elements previously referenced bear the reference numerals initially assigned. Assuming the switch is closed, current flowing through the pitot probe heater is coupled via the switch 13 and a current transformer 47, having a current transformation ratio $\alpha$, to a resistor $R_I$. $V_I$, the voltage across the resistor $R_I$ is amplified by an amplifier 51 having an amplification $A_I$. The amplified current responsive voltage is applied to the resistance detector 21, which may be a difference amplifier 53 having an noninverting terminal coupled to receive the amplified current responsive voltage.

The 115 volt AC source applied to the probe is coupled through a transformer 55, having a voltage transformation ratio $\beta$, to a potentiometer 57. The voltage $V_V$ at secondary output of the transformer 55 is the signal input to an amplifier 59 having a gain $A_V$ selectable by positioning the wiper arm of the potentiometer 57. The amplified voltage responsive to the probe source voltage is coupled from the output of the amplifier to the inverting terminal of the difference amplifier. Since the current $I_P$ through the probe is equal to $V_P/R_P$ it should be recognized that the output of the difference amplifier 53 is given as:

As shown in FIG. 3, samples of $V_I$ and $V_V$ are taken at the negative peaks of the current wave 43 and the voltage wave 45. Consequently, the output signal $A_O$ of the difference amplifier 53 is at a low level when $|V_I|$ is greater than $|V_V|$ and at a high level when $|V_I|$ is less than $|V_V|$. Since $R_I$ and K are constants set for a selected critical value, a low level signal at the output of the difference amplifier 53 indicates that the probe resistance $R_P$ is below the selected critical value. Conversely, when $A_O$ is a high level signal, K is greater than $R_I/R_P$ and $R_P$ is above the critical value. The signal level $A_O$ is the signal coupled from the resistance detector 21 to the latch 33 for subsequent entry to the logic circuit 41 as shown in FIG. 2. The circuit of FIG. 5 is but one that may be employed for the resistance detector 21. It should be recognized that resistance determinations may be made with circuits other than the circuit described above. Such other circuits include bridge circuits and circuits which perform direct calculations of the source voltage to the probe heater current.

Referring again to FIG. 2, the voltage at the output of the voltage sensor 19 is coupled to a voltage monitor 61 which may be a difference amplifier having a threshold coupled to the noninverting terminal and the output terminal of the voltage sensor coupled to the inverting terminal. Thus, a high level signal is provided at the output of the voltage monitor when the voltage from the voltage sensor is below the threshold. A low level signal is provided at the output of the voltage monitor when the voltage from the voltage sensor is above the threshold. The threshold is selected at a voltage level for the 115 volt AC source below which the probe does not operate efficiently, which for example may be 87.5 volts AC. The output signal of the voltage monitor is coupled to the latch 35 wherefrom it is coupled to the logic circuit 41 and to a terminal 63 to provide a voltage fault indication.

The voltage at the output terminal of the current sensor 15 is also coupled to current monitor 65, which may be a difference amplifier having the current sensitive voltage from the current sensor coupled to the inverting terminal and a threshold voltage coupled to the noninverting terminal. Consequently, when the current through the probe is below a critical value, established by the threshold setting, a high level signal is provided at the output terminal of the current monitor 65 and coupled to the latch 31. The threshold level is selected to represent a probe heater resistance value above which the probe heater may be considered to be open circuited. It should be recognized that a probe heater shorted to the case of the probe has the current return on the skin of the aircraft instead of the return line and consequently appears as an open circuit to the heater controller. During such a failure, the heater controller will heat the probe by reapplying power for at least one clock pulse every 40 ms, as will become apparent. When clocked, latch 31 provides the current status of the previous sample to an output terminal 67.

Figure 6:
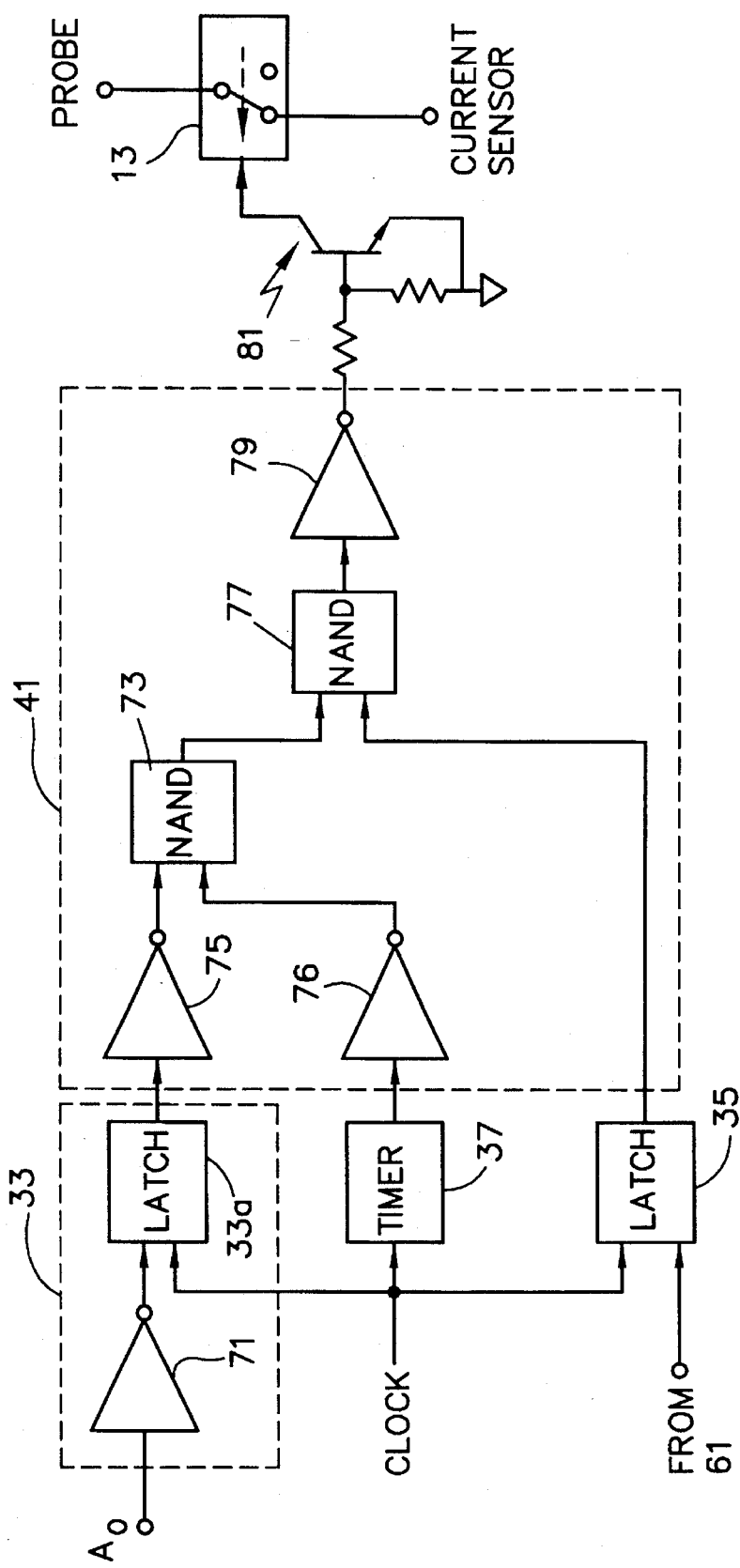
FIG. 6 is a block diagram of circuits that may be employed to perform the logic required for controlling the switch.

Refer now to FIG. 6 and assume that the voltage coupled to the voltage monitor 61 from the voltage sensor is above the threshold value, the switch 13 is closed, and that $R_t/R_p$ is greater than K. With these assumptions, a low level $A_O$ value is coupled to latch circuit 33, which includes an invertor 71 and a latch 33a. The low level signal is coupled to the invertor 71 wherefrom a high level signal is coupled to the latch 33a. At the next clock pulse, the high level signal is coupled from the latch 33a to the logic circuit 41. Logic circuit 41 includes a second invertor 75, coupled to the latch 33a, a NAND gate 73, having one input terminal coupled to receive signals from the latch 33a and a second input terminal coupled to receive signals from a third invertor 76, a second NAND gate 77, having a first input terminal coupled to receive signals from the NAND gate 73 and a second input terminal coupled to receive signals from the latch 35, and a fourth invertor 79. It is well known that a NAND gate provides a low level signal when high level signals are simultaneously coupled to all input terminals and provides a high level signal when a low level signal is coupled to at least one of the input terminals. A truth table for a NAND gate is shown in FIG. 6a. Though the logic circuit described is composed of NAND gates and invertors, it should be recognized that other types of logic elements could have been employed to provide the same input signal to output signal transfers to be described.

The high level signal from latch 33a is coupled to the invertor 75, from which a low level signal is coupled to NAND gate 73, wherefrom a high level is coupled to one input terminal of NAND gate 77. The high level signal provided by the voltage monitor 61 is coupled via the latch 35 to the second input terminal of the NAND gate 77. The two high level signals at the input terminals of NAND gate 77 cause a low level signal to be coupled to the fourth invertor 79, wherefrom a high level signal is coupled to the base of transistor 81 causing it to cut-off and thereby creating a high level signal at the control terminal of switch 13, a condition for closing the switch and maintaining current flow through the probe heater.

When $A_O$ is at a high level, indicating that the resistance of the probe heater is above the critical value, the signal coupled through the invertors 71 and 75 and the latch 33a to the NAND gate 73 is at a high level. It should be recalled that, with the exception of the first 2.5 ms of the 40 ms cycle, the signal level at the output terminal of the timer 37 is at a low level. This low level signal is coupled to the invertor 76 which provides a high level signal to the second input terminal of NAND gate 73. The two high level signals cause a low level signal to be coupled from NAND gate 73 to NAND gate 77. Thus, a high level signal is established at the output terminal of NAND gate 77 which is coupled to the invertor 79. This high level signal is inverted by invertor 79 and a low level signal is coupled to the gate of transistor 81. The low level signal at the transistor gate causes the transistor to cut-off, establishing a high level signal at the control terminal of the switch 13, thereby opening the switch and interrupting the flow of current through the probe heater.

When the switch 13 is open, the current sensor 15 does not receive current during subsequent sampling periods, thus indicating a probe heater open circuit. This apparent open circuit maintains $A_O$ at a high level for all sampling periods remaining in the 40 ms cycle. The level of $A_O$ is inverted by invertor 71 and a low level signal is provided to invertor 75 via latch 33a, thereby providing a high level signal to NAND gate 73 causing switch 13 to remain open for the remainder of the 40 ms cycle. At the commencement of the next 40 ms cycle, the reset pulse 39 is coupled from timer 37 to the invertor 76 wherefrom a low level signal is coupled to NAND gate 73. As explained above, a low level signal coupled to NAND gate 73 provides a closing signal to the switch 13 when a high level signal, indicating operable AC voltage, is provided to NAND gate 77 via the latch 35 by the voltage monitor 61. Thus, the switch 13 is reset by the reset pulse 39 and the temperature monitoring cycle is repeated.

If the source AC voltage is below the critical value, a low level signal is coupled from the voltage monitor 61, via latch 35, to the NAND gate 77 causing a high level signal to be coupled to the invertor 79 and a low level signal therefrom to the gate of transistor 81. The low level signal at the gate drives transistor 81 to cut-off and establishes a high level signal at the control terminal of the switch 13, causing the switch to open and preventing current from flowing through the probe heater. As shown in FIG. 2, the low level signal caused by the voltage fault is also coupled from the latch 35 to the voltage monitor terminal 63 to indicate that the current through the probe heater has been interrupted due to a voltage fault.

Figure 7:
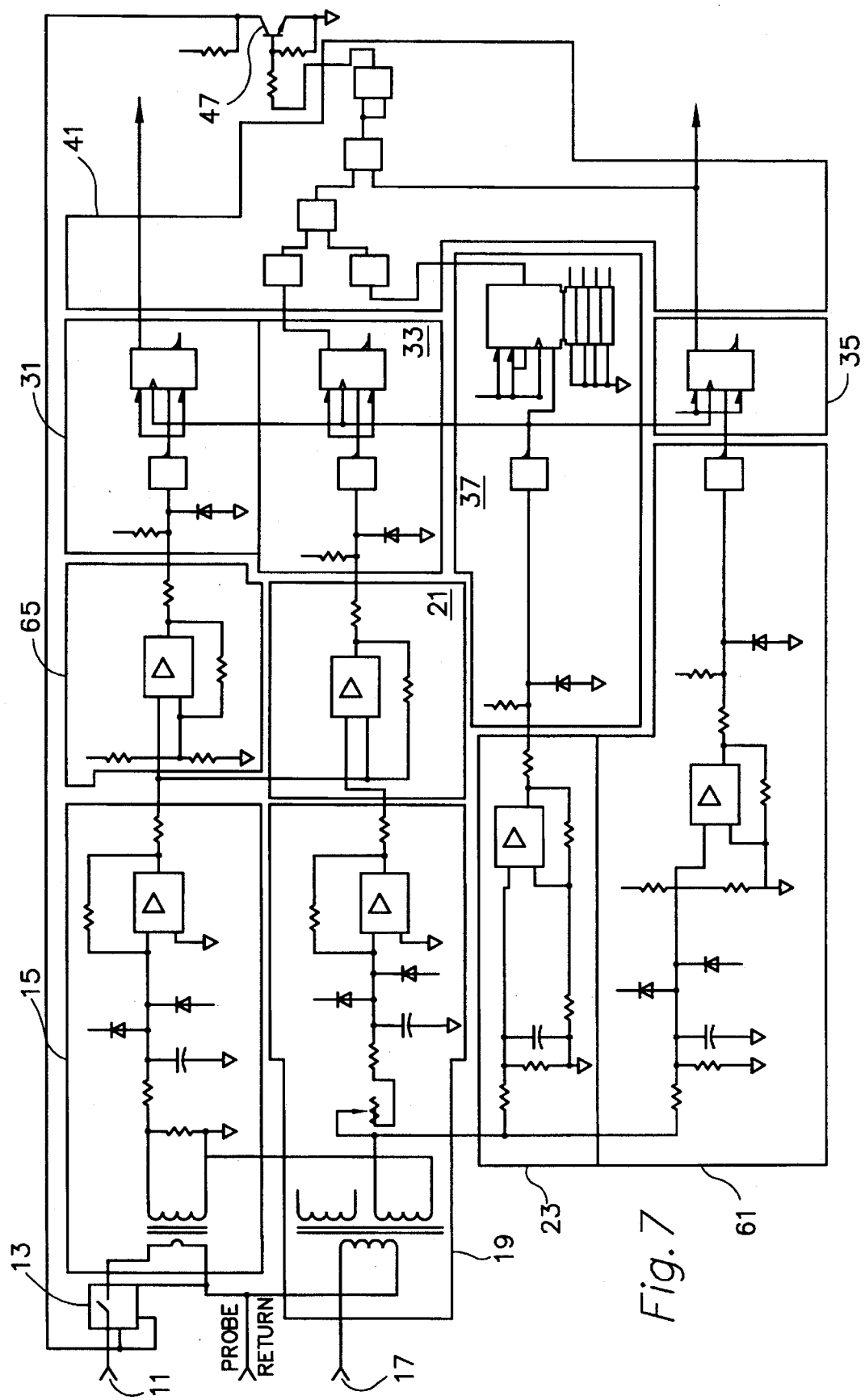
FIG. 7 is a detailed schematic diagram of the preferred embodiment.

A detailed schematic diagram of the invention, wherein the circuits are blocked out to correspond with the blocks of FIG. 2, is shown in FIG. 7.

Since the clock pulses are derived from the frequency of the voltage applied to probe heater and all the voltages processed are functions of the applied voltage, it should be apparent that the temperature monitor disclosed herein is insensitive to frequency and amplitude variations of the applied voltage.

While the invention has been described in its preferred embodiment, it is to be understood that the words are words of description rather than limitation and that changes may be made within the purview of the appended claims without departing from the true scope and spirit of the invention in its broader aspects.

We claim:

1. An apparatus for controlling the temperature of a device wherein heat is generated by current flowing through a heating element due to an applied voltage having a predetermined frequency, the heating element having a resistor with a temperature variable resistance value, the apparatus comprising:

means (51,53,59) responsive to said current and voltage for sampling said resistance value at a sampling rate determined by said predetermined frequency and providing a signal representative of said resistance value and for providing reset signals at a predetermined rate, said predetermined rate being less than said sampling rate;

logic means (41) coupled to said resistance value means (21) for providing a control signal in accordance with said resistance value representative signal; and switch means (13,47) responsive to said control signal and said reset signals for preventing current flow through said heating element when said resistance value representative signal indicates that said resistance of said heating element exceeds a predetermined resistance value, said switch means being reset by each of said reset signals.

2. An apparatus in accordance with claim 1 wherein said resistance value means includes:

means (47,$R_t$,51) for sensing current through said resistor and providing a voltage signal representative of said current;

means (55,59,57) for sensing voltage applied across said resistor and providing a signal representative of said applied voltage;

means (53) responsive to said current representative voltage signal and said applied voltage representative signal for providing said signal representative of said resistance value.

3. An apparatus in accordance with claim 2 wherein:

said current sensing means includes a fixed value resistor ($R_f$) coupled to receive sensed current to generate a voltage representative of said sensed current, and an amplifier (51) coupled to receive said voltage representative of said sensed current and provide an amplified sensed current representative voltage signal;

said voltage sensing means includes an amplifier (59,57) with a variable amplification value coupled to receive said applied voltage representative signal and provide an amplified applied voltage representative signal; and said resistance value means is a difference amplifier (53) coupled to receive said current representative voltage signal and said amplified applied voltage representative signal to provide an output signal representative of said resistance value.

4. An apparatus in accordance with claim 2 wherein said current and voltage are sine waves and further including means coupled to said current sensing means and said voltage sensing means for aligning said corresponding half cycle peaks of said current and voltage sine waves so that said resistance value is determined at said corresponding half cycle peaks.

5. An apparatus for controlling the temperature of a device wherein heat is generated by current flowing through a heating element having a resistor with a temperature variable resistance value, the apparatus comprising:

means (47,$R_f$,51) for sensing current through said resistor and providing a signal representative of said current;

means (55,57,59) for sensing voltage applied across said resistor and providing a signal representative of said applied voltage;

means (53) responsive to said current representative signal and said applied voltage representative signal for providing a signal representative of said resistance value and for preventing current flow through said heating element when said resistance value representative signal indicates that said resistance of said heating element exceeds a predetermined resistance value;

means (65) coupled to receive said signal representative of said current for providing a fault indication when said signal representative of said current is less than a preselected voltage level; and means (61) responsive to said signal representative of said applied voltage for providing a fault indication when said applied voltage is lower than a predetermined voltage level.

6. A temperature controller for a pitot probe having a heating element which generates heat by current flowing through a resistor having a resistance variable with temperature, said temperature controller comprising:

means (15) for sensing said current and providing a voltage representative thereof;

means (19) for sensing voltage applied across said resistor and providing a signal representative thereof, said voltage having a predetermined frequency;

means (23,31,37) responsive to said applied voltage for sampling said resistance value at a sampling rate determined by said predetermined frequency and for providing reset signals at a predetermined rate, said predetermined rate being less than said sampling rate;

means (23,33) coupled to said current sensing means and said voltage sensing means for sampling said voltage representative of said applied voltage and said voltage representative of said current at said predetermined rate;

detector means (21) responsive to said voltage representative of said applied voltage and said voltage representative of said current for providing a signal representative of said variable resistance value; and switch means (13,41,47) responsive to said signal representative of said variable resistance value and said reset signals for preventing current flow through said resistor when said variable resistance value representative signal indicates that said variable resistance value exceeds a predetermined level, said switch means being reset by said reset signals.

7. A method of controlling temperature of a device heated by current flowing through a heating element due to an applied voltage at a predetermined frequency, the heating element having a resistance value variable with temperature comprising the steps of:

providing sampling signals at a first rate and reset signals at a second rate, said first and second rates determined by said predetermined frequency, said first rate being greater than said second rate;

determining temperature by detecting said resistance value of said heating element;

sampling said resistance value at said first rate and providing a control signal in accordance with a resistance value of said resistor at each sample;

preventing current flow through said heating element when said control signal indicates that said resistance value exceeds a predetermined resistance value; and reestablishing current flow through said heating element by each of said reset signals.

8. A method of controlling temperature of a device in accordance with claim 7 wherein the sampling step includes the steps of:

providing signals respectively representative of current flow through and voltage applied to said resistor;

utilizing said current and voltage representative signals to provide a signal representative of said resistance value.

9. A method of controlling temperature of a device in accordance with claim 8 wherein said current and voltage are sine waves and said sampling step further includes the steps of:

aligning half cycle peaks of said current with corresponding half cycle peaks of said voltage during sampling periods; and utilizing said current and voltage half cycle peaks to provide said signal representative of said resistance value.

10. A method of controlling temperature of a device in accordance claim 7 further including the steps of:

monitoring said voltage applied to said heating element;

comparing said voltage to a preselected voltage level;

providing a fault indication when said voltage does not exceed said preselected voltage level;

monitoring said current flow;

comparing said current flow to a preselected current flow level; and providing a fault indication when said current flow does not exceed said preselected current flow level.

11. A method of controlling temperature of a device heated by current flowing through a heating element having a resistance variable with temperature comprising the steps of:

determining temperature by detecting said resistance value of said resistor;

providing signals respectively representative of current flow through and voltage applied to said resistor;

utilizing said current and voltage representative signals to provide a signal representative of said resistance value;

monitoring said voltage applied to said resistor;

comparing said voltage to a preselected voltage level;

providing a fault indication when said voltage does not exceed said preselected voltage level;

monitoring said current flow;

comparing said current flow to a preselected current flow level; and providing a fault indication when said current flow does not exceed said preselected current flow level.

\* \* \* \* \*